(12) United States Patent
Yang et al.

(10) Patent No.: US 8,718,640 B2
(45) Date of Patent: May 6, 2014

(54) METHOD FOR TRIGGERING ROAMING RETRY AND A HOME LOCATION REGISTER

(75) Inventors: Bo Yang, Shenzhen (CN); Zhaoming Ding, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 114 days.

(21) Appl. No.: 13/258,949

(22) PCT Filed: Jun. 9, 2010

(86) PCT No.: PCT/CN2010/073707
§ 371 (c)(1),
(2), (4) Date: Apr. 26, 2012

(87) PCT Pub. No.: WO2010/148952
PCT Pub. Date: Dec. 29, 2010

(65) Prior Publication Data
US 2012/0202488 A1 Aug. 9, 2012

(30) Foreign Application Priority Data
Dec. 4, 2009 (CN) .......................... 2009 1 0246199

(51) Int. Cl.
*H04W 4/00* (2009.01)
(52) U.S. Cl.
USPC ....................... 455/433; 455/432.1
(58) Field of Classification Search
None
See application file for complete search history.

(56) References Cited

U.S. PATENT DOCUMENTS 8,351,931 B2 * 1/2013 Yang et al. ................. 455/432.1
2011/0081907 A1 4/2011 Yang et al.

FOREIGN PATENT DOCUMENTS

| CN | 1474626 A | 2/2004 | |
| CN | 101287293 A | 10/2008 | |
| WO | 0201903 A1 | 1/2002 | |
| WO | WO 2008033951 A2 * | 3/2008 | H04W 8/12 |

OTHER PUBLICATIONS

3rd Generation Partnership Project, "3GPP TS 23.018 V10.1.0 Technical Specification", Mar. 2011.

* cited by examiner

*Primary Examiner* — Erika A Washington
(74) *Attorney, Agent, or Firm* — Christopher L. Parmelee; Walker & Jocke

(57) ABSTRACT

A method for triggering a roaming retry and a home location register (HLR) are provided. The method is applied to a situation that a mobile station (MS) moves from an original Visitor Mobile Switching Center (VMSC)/Visitor Location Register (VLR) to an area covered by a new VMSC/VLR. The method comprises: the HLR receiving a location updating request message from the mobile station through the new VMSC/VLR when requesting for allocating a roaming number or providing subscriber information (S201); and the HLR triggering a roaming retry process when the mobile station completes location updating in the area covered by the new VMSC/VLR (S203). The technical solution above solves the problem of Pre-paging failure in the related art, which is caused when a called user roams simultaneously out of the local location area during the pre-paging.

20 Claims, 11 Drawing Sheets

METHOD FOR TRIGGERING ROAMING RETRY AND A HOME LOCATION REGISTER

CROSS-REFERENCE TO RELATED APPLICATIONS

This application is a national stage of International PCT Application No. PCT/CN2010/073707 filed 9 Jun. 2010, and claims the benefit of a foreign priority application filed in China as serial No. 200910246199.5 on Dec. 4, 2009.

FIELD OF THE INVENTION

The present invention relates to the communication field, and in particular, to a method for triggering roaming retry and a home location register.

BACKGROUND OF THE INVENTION

As everyone knows, a 3G core network is comprised of a mobile switching center ("MSC" for short), a visitor location register ("VLR" for short), a home location register ("HLR" for short) and a radio network controller ("RNC" for short), wherein the MSC may be classified into gateway mobile switching center ("GMSC" for short) and visitor mobile switching center ("VMSC" for short) according to functions, the GMSC is responsible for inquiring the MSC of routing information of a called user, and the VMSC is a visited MSC of a user and also a destination that a call is to be routed to; and the VLR is a visitor location register of a user, the HLR is a home location register of a user, and the RNC is a network element responsible for completing radio access function of a user.

When inquiring the routing, a GMSC will first send a routing request message (send routing information, "SRI" for short) to an HLR which then sends a request for providing a roaming number (provide roaming number, "PRN" for short) message to a VLR where a called user is located. After receiving the PRN message, the VLR where the called user is located will check parameters in the message. If the message requests the called VLR to start a pre-paging process, a PRN RSP message will be returned to the HLR after the pre-paging is finished, and a SRI RSP message is returned by the HLR to the GMSC. In this case, if the VMSC supports the pre-paging, a process of pre-paging may last about 10 seconds. Then, during the pre-paging period it is highly possible that the quick move of called MS will cause a pre-paging failure. When the VMSC does not support the pre-paging, though the VMSC will quickly return a PRN response message to the HLR, it is still very possible that the user moves during this process. Such situation still may occur even if the probability is quite low.

The existing roaming retry technology is a technology used for solving the problem of call failure caused by the user moving out of the current location area while the final called user is called. Since there may be a certain period between the time when the HLR has requested and obtained the roaming number from the VMSC of a called user and the time when the VMSC where the user is located receives an initial address message ("IAM" for short) sent from the GMSC, a user having a strong mobility and located at an edge of the location area may move into another location area. Thus, this technology is advantageous for improving the probability of successful call of the user having a strong mobility.

A flow of the existing roaming retry technology is as shown in FIG. 1. FIG. 1 is a schematic diagram of an information interaction of a roaming retry in the related art. As shown in FIG. 1, the flow mainly includes the following processes (step S101-step S117).

Step S101: a GMSC first sends a SRI message to a HLR, wherein the message carries a roaming retry support flag.

Step S102: the HLR then forwards a PRN message to an original VMSC/VLR for requesting a roaming number, wherein the message carries the roaming retry support flag.

Step S103: the original VMSC/VLR returns to the HLR a PRN ACK message carrying a mobile station roaming number ("MSRN" for short).

Step S104: the HLR returns to the GMSC a SRI ACK message carrying the roaming number.

Step S105: the GMSC sends an initial address message (TAM message) to the original VMSC.

Step S106: VMSC/VLR initiates a paging after the original VMSC/VLR receives the TAM message.

Step S107: just at this time, the user moves, and the process of a new VMSC initiating the location updating starts, and a mobile station ("MS" for short) sends a location updating request (Location Update) to the new VMSC/VLR.

Step S108: the new VMSC will send an updating location area request to the HLR.

Step S109: at this time, the HLR sends a canceling location area message (Cancel Location) to the original VMSC which then returns a canceling location area response (Cancel Location Ack) to the HLR.

Step S110: the original VMSC receives the Cancel Location message, and a paging timer may be first stopped to cancel the paging as the paging is still carried out at this time, and the GMSC is informed to perform a roaming retry via step S111; at the same time, the new VMSC/VLR starts a process of inserting subscriber data.

Step S111: the original VMSC/VLR sends a RCH message (Resume Call Handling) to inform the GMSC to perform a roaming retry, which message carries a roaming retry indication identifier.

Step S112: the GMSC releases a call with the original VMSC/VLR using an REL/RLC message (release message of ISUP, corresponding to the IAM message).

Step S113: at this time, after receiving the RCH message, the GMSC will initiate a second process of obtaining a roaming number, which is called roaming retry. The SRI message sent for the second time no longer carries the roaming retry support flag therein.

Step S114: after completing the location updating, the HLR delays sending a PRN to the new VMSC/VLR.

Step S115: after receiving a PRN ACK sent from the new VMSC/VLR, the HLR returns to the GMSC a SRI ACK message containing a new mobile station roaming number (MSRN).

Step S116: the GMSC, using the MSRN', sends the initial address message (IAM message) to the new VMSC/VLR.

Step S117: the new VMSC/VLR initiates a call process after the location updating is completed.

As seen from the above flow descriptions and various documents describing the protocol in detail, in the current method for triggering a roaming retry, if the user starts to use pre-paging when the original VMSC/VLR receives the SRI/PRN for the first time, and the user moves and receives the canceling location area message (Cancel Location) during the pre-paging, the PRN process at this time will be directly failed if processed according to the previous protocol. And a PRN ACK message carrying an error indication is returned to the HLR in step 103. Also, according to the SDL figure of the revised 3GPP protocol, if the Cancel Location is received during the pre-paging, then the roaming retry during the pre-paging is not taken into consideration. In fact, it is still processed on the basis of call failure.

Thus in the related art, for the situation of non-pre-paging, there is only the solution provided for the problem of roaming retry in the situation of non-pre-paging for the user having a strong mobility. But for the user of pre-paging, the above flow will cause a call failure.

SUMMARY OF THE INVENTION

The present invention is proposed upon considering the problem of pre-paging failure in the related art when a called user simultaneously roams out of a local location area during the pre-paging. Thus the main object of the present invention lies in providing an improved method for triggering a roaming retry process and a home location register so as to solve at least one of the above problems.

A method for triggering a roaming retry process is first provided according to one aspect of the present invention. The method is applied to a situation that a mobile station moves from an original VMSC/VLR to an area covered by a new VMSC/VLR.

The method for triggering the roaming retry process according to the present invention mainly includes the following processes:

a home location register receiving a location updating request message from the mobile station through the new VMSC/VLR when requesting for allocating a roaming number or providing subscriber information; and HLR triggering the roaming retry process when the mobile station completes location updating in the area covered by the new VMSC/VLR.

A home location register is further provided according to the other aspect of the present invention. The register is also applied to a situation that a mobile station moves from an original VMSC/VLR to an area covered by a new VMSC/VLR.

The home location register according to the present invention comprises a first receiving unit and a roaming retry triggering unit, wherein the first receiving unit is configured to receive a location updating request message from the mobile station through the new VMSC/VLR when requesting for allocating a roaming number or user location information; and the roaming retry triggering unit is configured to trigger a roaming retry process when the mobile station completes location updating in the area covered by the new VMSC/VLR.

By the present invention, the problem of pre-paging failure in the related art caused when a called user simultaneously roams out of the local location area during the pre-paging is solved by the HLR triggering a roaming retry process. Furthermore, a call flow of a user having a strong mobility may be perfected and the probability of successful call is improved in the situation that the user having a strong mobility is located at an edge of the location area.

Other features and advantages of the present invention will be illustrated in the following description and partially become obvious from the description or understood by implementing the present invention. The object and other merits of the present invention will be accomplished and obtained via the structures particularly indicated in the description, claims and drawings.

BRIEF DESCRIPTION OF THE DRAWINGS

The drawings illustrated herein provide a further understanding of the present invention and form a part of the present application. The exemplary embodiments in the present invention and the description thereof are used to explain the present invention without unduly limiting the present invention. In the drawings.

DETAILED DESCRIPTION OF EMBODIMENTS

It should be indicated that the embodiments and features therein in the present application can be combined if they are not conflicted with each other.

The present invention will be described hereinafter in detail with reference to the drawings and in conjunction with the embodiments.

Method Embodiments

A method for triggering a roaming retry is first provided according to an embodiment of the present invention.

Figure 1:
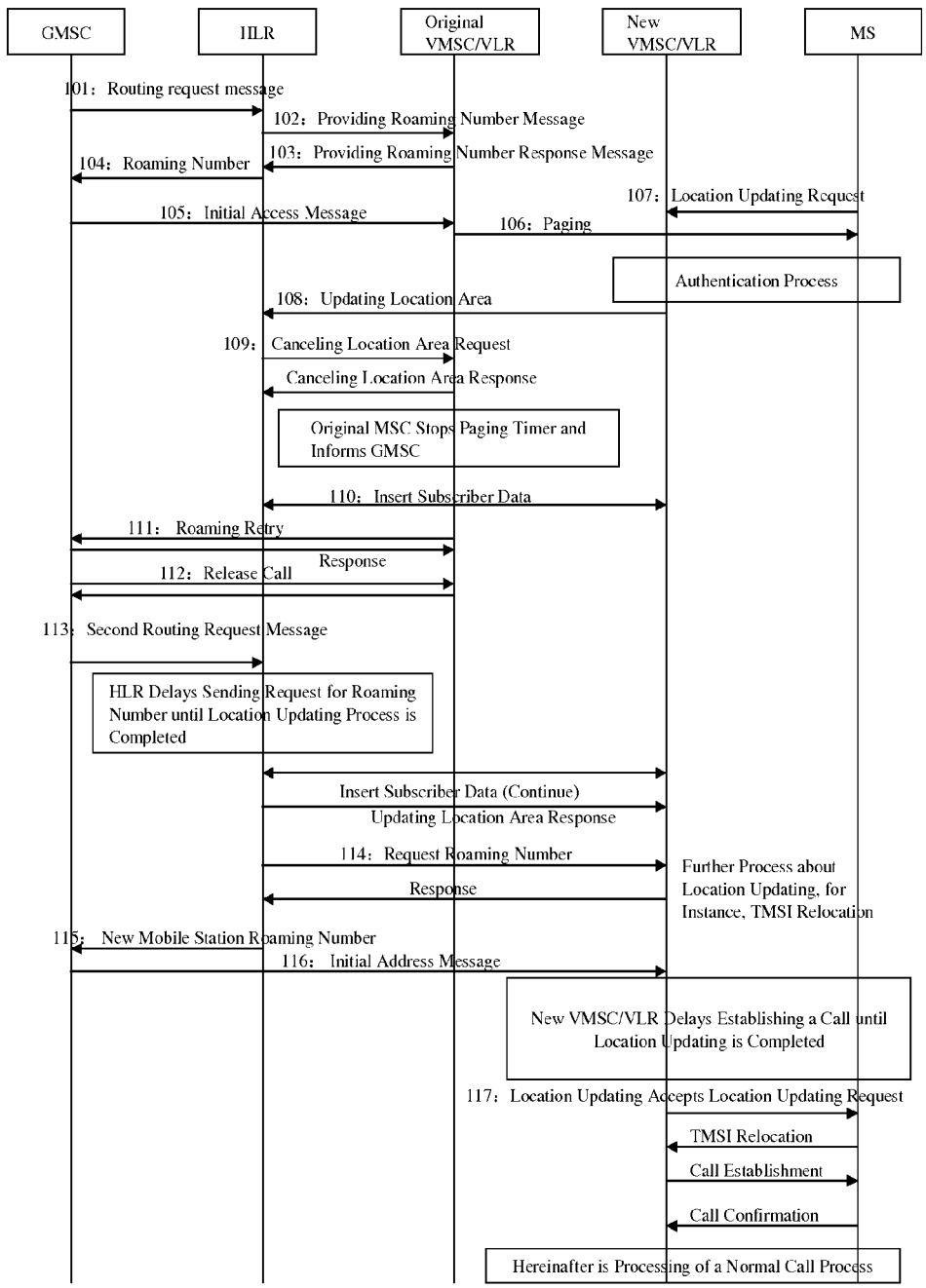
FIG. 1 is a schematic diagram of signaling interaction of a roaming retry in the related art.
Figure 2:
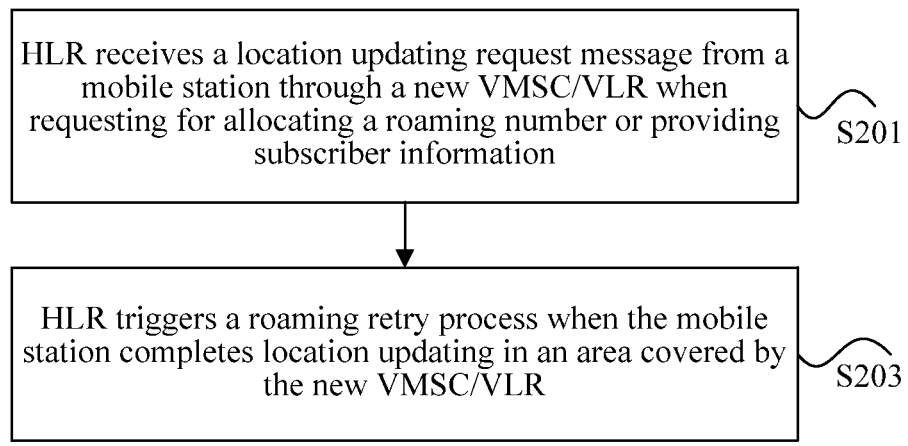
FIG. 2 is a flow chart of a method for triggering a roaming retry according to an embodiment of the present invention.

FIG. 2 is a flow chart of a method for triggering a roaming retry according to an embodiment of the present invention. In this case, the method is applied to a situation that a mobile station moves from an original visitor mobile switching center (VMSC)/visitor location register (VLR) to an area covered by a new VMSC/VLR. As shown in FIG. 2, the method for triggering a roaming retry mainly includes the following processes (step S201-step S203).

Step S201: a home location register (HLR) receives a location updating request message from the mobile station through the new VMSC/VLR when requesting for allocating a roaming number or providing subscriber information.

Step S203: the HLR triggers a roaming retry process when the mobile station completes location updating in the area covered by the new VMSC/VLR.

The problem of pre-paging failure in the related art caused when a called user roams simultaneously out of the local location area during the pre-paging is solved by the HLR triggering the roaming retry process. Rerouting will be successful since the roaming retry process is triggered after mobile station completes the location updating in the area covered by the new VMSC/VLR.

Preferably, the method may further include the following processes when step S201 is carried out:

(1) the HLR receives a routing request message from a gateway mobile switching center (GMSC) or a real-time inquiry request message from a service control point (SCP);

(2) the HLR sends to the original VMSC/VLR a request message for providing the roaming number or a request message for providing the subscriber information; and (3) the original VMSC/VLR allocates the roaming number or returns the subscriber information.

Preferably, the HLR terminates a session with the original VMSC/VLR when the HLR receives the location updating request message from the mobile station through the new VMSC/VLR.

Preferably, the HLR may terminate the session with the original VMSC/VLR in the following two manners.

Manner 1: the HLR sends to the original VMSC/VLR a canceling request of a process of providing the roaming number or providing the subscriber information; and the original VMSC/VLR terminates a process that is currently carried out for providing the roaming number and providing the subscriber information.

Manner 2: the HLR sends a canceling location area request message to the original VMSC/VLR; the original VMSC/VLR terminates a process that is being carried out for requesting for allocating the roaming number or providing the subscriber information, and returns a roaming retry flag or a special failure cause value in a response message about requesting for allocating the roaming number or providing the subscriber information.

In a specific implementing process, if a pre-paging process is also initiated when the original VMSC/VLR allocates the roaming number, the current pre-paging process also needs to be interrupted when the original VMSC/VLR terminates a process that is currently carried out for providing the roaming number.

Preferably, the original VMSC/VLR interrupting the current pre-paging process may further comprise the following processes:

(1) the original VLR sends a message for interrupting a pre-paging to the VMSC via an interface between the VMSC and the VLR; and (2) the VMSC interrupts the current pre-paging process.

In the above, the VLR and the VMSC are jointly configured (i.e. they are configured on the same network element), and there is a communication interface between the VLR and the VMSC.

In a specific implementing process, the HLR may trigger the roaming retry process in the following manners.

Manner 1: the HLR receives the location updating request message from the new VMSC/VLR when it requests the original VMSC/VLR (i.e. original VMSC/VLR) for allocating the roaming number, and it is the HLR that triggers the roaming retry, i.e. the HLR directly triggers the roaming retry process.

Manner 2: the HLR receives the location updating request message from the new VMSC/VLR when it requests the original VMSC/VLR (i.e. original VMSC/VLR) for allocating the roaming number or subscriber information; and the message is transmitted transparently to the original VMSC/VLR, and transmitted to the HLR by the original VMSC/VLR via a PRN ACK message carrying the roaming retry flag or a PRN ACK message carrying the special failure cause value; and it is the HLR that triggers the roaming retry.

Specifically, Manner 2 may comprise the following processes:

(1) the HLR receives from the original VMSC/VLR a response message about providing the roaming number or providing the subscriber information, wherein the response message carries information of the roaming retry flag and/or the failure cause value; and (2) the HLR determines a triggering according to the roaming retry flag and/or the failure cause value.

Preferably, the roaming retry process triggered by the HLR comprises the following processes:

(1) the HLR sends to the new VMSC/VLR a request message for providing the roaming number or requesting the subscriber information;

(2) the HLR receives a mobile station roaming number or the subscriber information from the new VMSC/VLR, and returns a routing request response message.

In a specific implementing process, the HLR needs to determine whether a location updating process of a current mobile station in the new VMSC/VLR is completed, before the HLR receives the mobile station roaming number or subscriber information from the new VMSC/VLR. Thereafter, the HLR sends a location area updating response to the new VMSC/VLR. The new VMSC/VLR determines the user location updating is completed after receiving the response message. Then the new VMSC/VLR initiates to the mobile station a process of allocating the roaming number or providing the subscriber information, or initiates a process of allocating the roaming number or providing the subscriber information after initiating the pre-paging process.

In the method for triggering the roaming retry process provided in the present invention, the HLR may decide whether to start the roaming retry process via configuration. The present invention is described mainly focusing on the situation that the called user starts the pre-paging, since the probability of pre-paging failure is quite high if the called user moves and roams during the pre-paging period. As a matter of fact, in the process of the HLR initiating a process of requesting for allocating the roaming number for the original VMSC/VLR, the roaming retry can be triggered as long as the location updating process initiated by the user in the new VMSC/VLR is received, regardless the pre-paging is started or not. The HLR may control to support the roaming retry during all SRI/PRN processes, and also may control to start the roaming retry only in the situation that the SRI/PRN request carries the pre-paging supported.

It can be seen from the above embodiments that there is only one process of the SRI requesting routing information between the GMSC and the HLR. And there is one process of requesting for allocating the roaming number between the HLR and the original VMSC/VLR, and between the HLR and the new VMSC/VLR, respectively. While there are two processes of the SRI requesting the routing information between the GMSC and the HLR in the process of triggering the roaming retry by the GMSC. Therefore it can save the times of message interaction.

Figure 3:
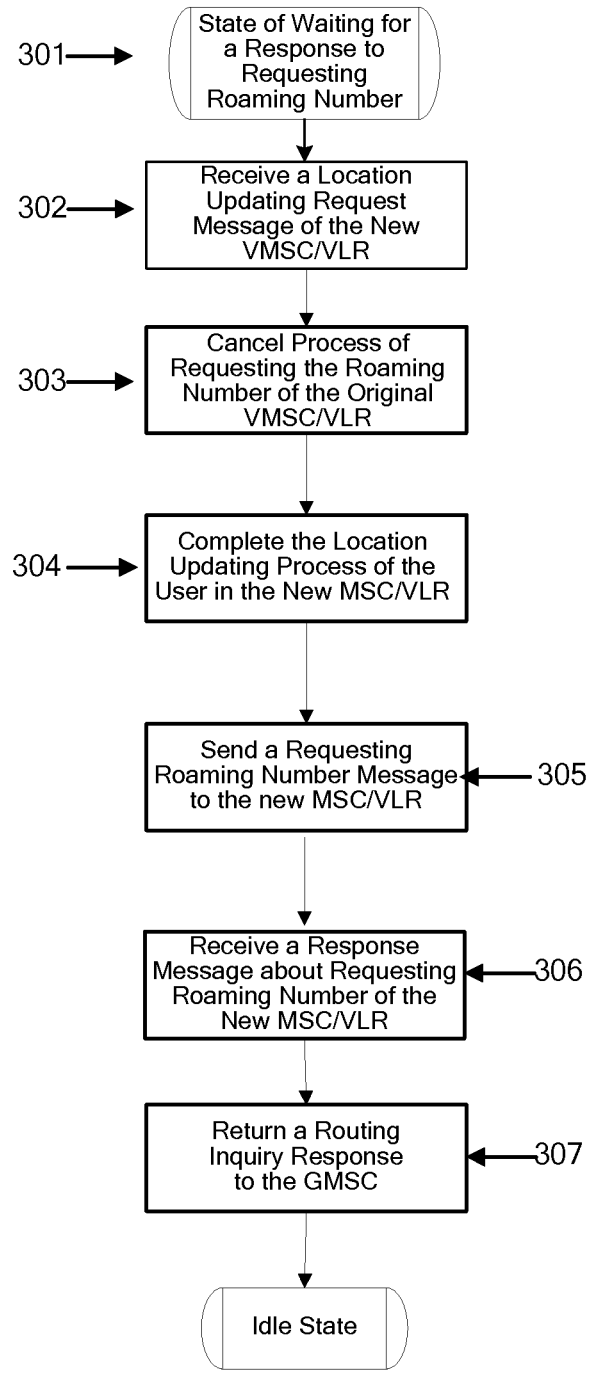
FIG. 3 is a flow chart according to a preferred embodiment of the present invention in which an HLR receives a location updating request from a user in a new MSC/VLR after sending a PRN request message, and triggers a roaming retry flow.

FIG. 3 is a flow chart according to a preferred embodiment of the present invention in which an HLR receives a location updating request from a user in a new MSC/VLR (new MSC/VLR), after sending a PRN request message, and triggers a roaming retry. As shown in FIG. 3, the flow comprises the following processes (step S301-step S307).

Step S301: after receiving a routing inquiry request message (SRI) of a GMSC, the HLR sends a request for a roaming number (PRN message) to an original MSC/VLR (original MSC/VLR) to request for allocating the roaming number, and triggers a pre-paging process of an original VMSC/VLR; and the HLR turns into a state of waiting for a response to the request for the roaming number after sending the PRN message.

Step S302: the HLR receives the location updating request message (Location Update request message) sent by a user in the new MSC/VLR.

In a specific implementing process, triggering the roaming retry comprises but is not limited to the following manners:

(1) the HLR determines whether a condition of the roaming retry is satisfied, and starts a roaming retry process; and (2) it is also possible that the HLR does not start the roaming retry process at this time, but transforms the location updating request message, which is sent by the user in the new MSC/VLR, into a Cancel Location message which is sent to the original MSC/VLR; and a PRNACK carrying a roaming retry flag or a PRNACK carrying a special failure cause is returned to the HLR by the original MSC/VLR, and then the HLR triggers the roaming retry by determining the flag or the special failure cause value.

Step S303: the HLR actively closes the previous process of requesting the roaming number to the original MSC/VLR.

Step S304: the HLR controls to complete a process of location updating of the user in the new MSC/VLR, and sends a canceling location area (Cancel Location) message to the original MSC/VLR to delete subscriber data of the mobile station (user terminal) in the original MSC/VLR.

Step S305: the HLR sends to the new MSC/VLR a request message for requesting the roaming number.

Step S306: the HLR receives a response message about requesting the roaming number returned from the new MSC/VLR.

Step S307: the HLR returns a routing inquiry response message to the GMSC, and the GMSC completes a routing inquiry process.

Please refer to the description in the 3$^{rd}$ Generation Partner Project ("3GPP" for short) 23.018 for the subsequent processes. The GMSC sends the IAM message to the new MSC/VLR to establish a call.

Figure 4:
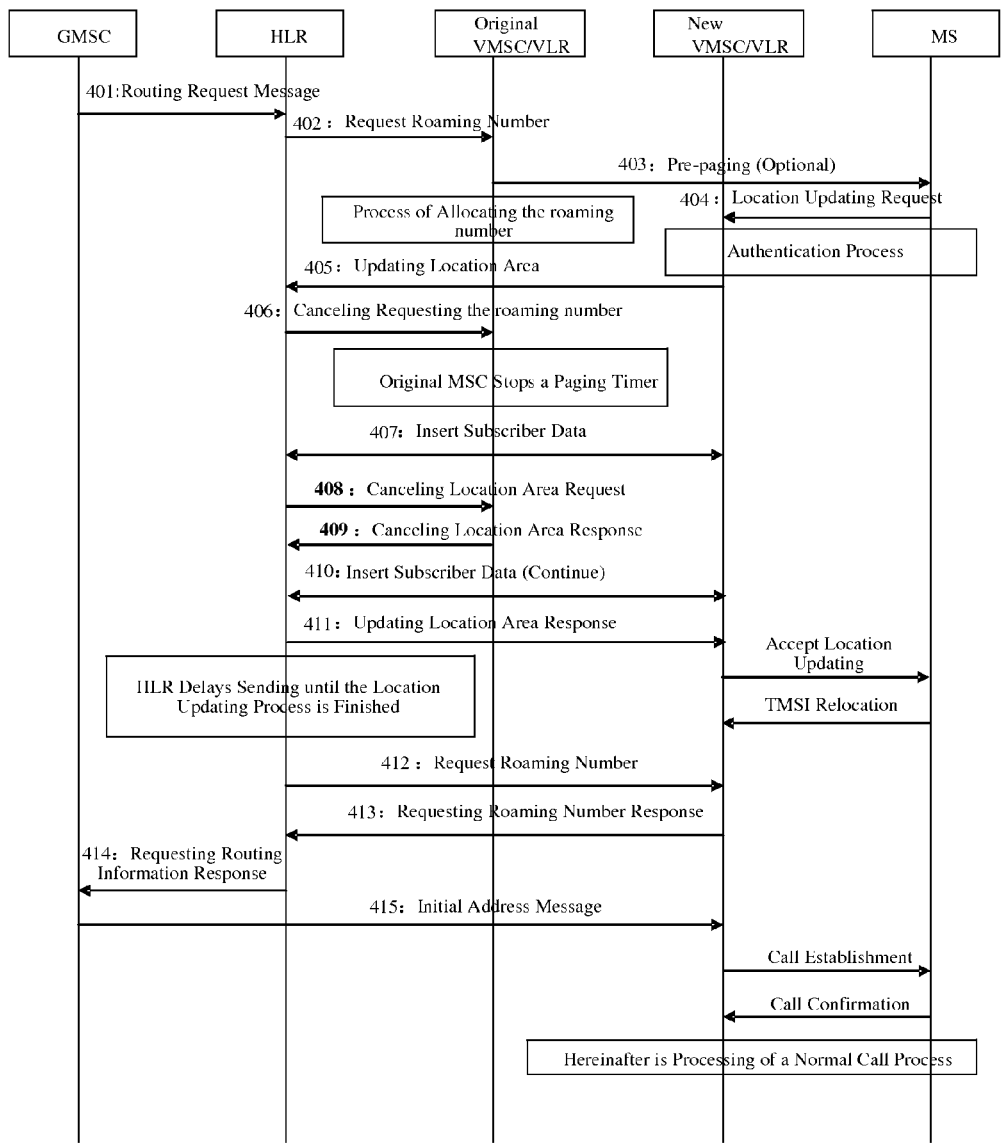
FIG. 4 is a schematic diagram of signaling interaction of an SRI/PRN roaming retry triggered by an HLR and detected by the HLR according to a preferred embodiment of the present invention.

FIG. 4 is a schematic diagram of signaling interaction flow of an SRI/PRN roaming retry triggered by an HLR and detected by the HLR according to the preferred embodiment of the present invention. As shown in FIG. 4, the signaling interaction flow comprises the following processes (step S401-step S415).

Step S401: a GMSC sends a routing request message (SRI).

Herein, the SRI message may carry or not carry a pre-paging supported indication.

Step S402: an HLR sends to an original VMSC/VLR a request message for providing a roaming number (PRN).

Herein, the PRN message may carry or not carry a pre-paging supported indication.

Herein, VMSC/VLR means the VMSC and the VLR are jointly configured, and these two devices are usually configured together and connected via an interface. Generally, it is unnecessary to describe messages therebetween.

Step S403: the original VMSC/VLR initiates a pre-paging process or a process of allocating the roaming number.

Herein, a probability of triggering a roaming retry during the pre-paging process is far higher than a probability of triggering a roaming retry during the process of allocating the roaming number because the pre-paging process is much longer than the process of allocating the roaming number.

Preferably, the flow of the HLR triggering the roaming retry may be applied to not only the pre-paging process but also the process of allocating the roaming number.

Optionally, it may be configured whether to allow the pre-paging. If the pre-paging is allowed, whether a final called user can be paged will first be confirmed through the pre-paging process triggered by the PRN message before a call reaches the VMSC where the final called user is located. If the paging is failed, there is no need to establish again a call to the VMSC, while if the paging is successful, the call may be connected to the VMSC. Therefore some operators will establish the pre-paging process because the pre-paging has the above advantages.

Step S404: during the pre-paging period, an MS moves into another new MSC/VLR and initiates a new location updating (Update Location) process.

Step S405: the new MSC/VLR sends a message for updating the location area (Update Location message) to the HLR to initiate a location updating process.

Step S406: the HLR detects that a location updating request message from the new MSC/VLR is received when requesting the original MSC/VLR for the roaming number.

The HLR actively releases a process of requesting the roaming number to the original MSC/VLR, stops the pre-paging process that is being carried out; and triggers step S408 after performing the present step.

As a matter of fact, as a timer of pre-paging of a core network during the pre-paging process is set quite long, the longest may be 9 seconds during which a user moving at a high speed may move a distance of more than 100 m. While within such distance of more than 100 m, a user at an edge of the location area absolutely may move from one location area into another location area. Such situation more likely occurs in a city where the base station coverage range is denser and the radio channel situation is complex.

Step S407: the HLR and the new VMSC/VLR are carrying out a process of inserting subscriber data (multiple) therebetween.

In a specific implementing process, step S406 and step S407 are not necessarily in a sequential order, but they may be carried out in parallel.

Step S408: the HLR sends a Cancel Location (canceling location area request) message to the original MSC/VLR to delete the subscriber data of the user in the original MSC/VLR.

Step S409: the original MSC/VLR returns a canceling location area response message to the HLR and completes a process of deleting the subscriber data in the original MSC/VLR.

Step S410: the HLR inserts the subscriber data in the new MSC/VLR.

In a specific implementing process, step S410 may include a plurality of steps.

Step S411: after inserting the subscriber data in the new MSC/VLR, the HLR completes a location updating process of the user in the new MSC/VLR, and sends an updating location area response to the new MSC/VLR.

In a specific implementing process, the user performing location updating in the new VMSC/VLR includes encryption and reallocation of temporary mobile subscriber identity ("TMSI" for short).

Step S412: after completing the location updating in the new MSC/VLR, the HLR triggers a roaming retry process, and initiates again a new process of requesting the roaming number to the new MSC/VLR.

In a specific implementing process, the HLR will delay sending the request message for providing the roaming number till the location updating process is finished.

Herein, the process of requesting the roaming number this time will succeed as the user has completed the location updating process in the new MSC/VLR.

It is appointed that the roaming retry is performed twice on the same HLR. Generally, each location area has a large coverage. All message flows herein are progressed very quickly and completed at the level of a second. The user will not move out of the new location area. It is supported to perform the roaming retry once at most, and incessant retry is not allowed.

Step S413: the new VMSC/VLR returns a roaming number to the HLR.

Step S414: the HLR returns the roaming number to the GMSC.

Step S415: the GMSC sends an IAM message to the new VMSC/VLR using a new roaming number, and the subsequent flow will proceed according to a flow of a normal call.

The above flow described in FIG. 4 is a processing flow of triggering the roaming retry on the HLR, in which the HLR should be enabled to make association between two different MAP sessions of the same user. The roaming retry triggered by the HLR may support the roaming retry function in the situation of pre-paging by only upgrading the HLR network elements, while no modification is needed to be made to interfaces between the network elements.

Figure 5:
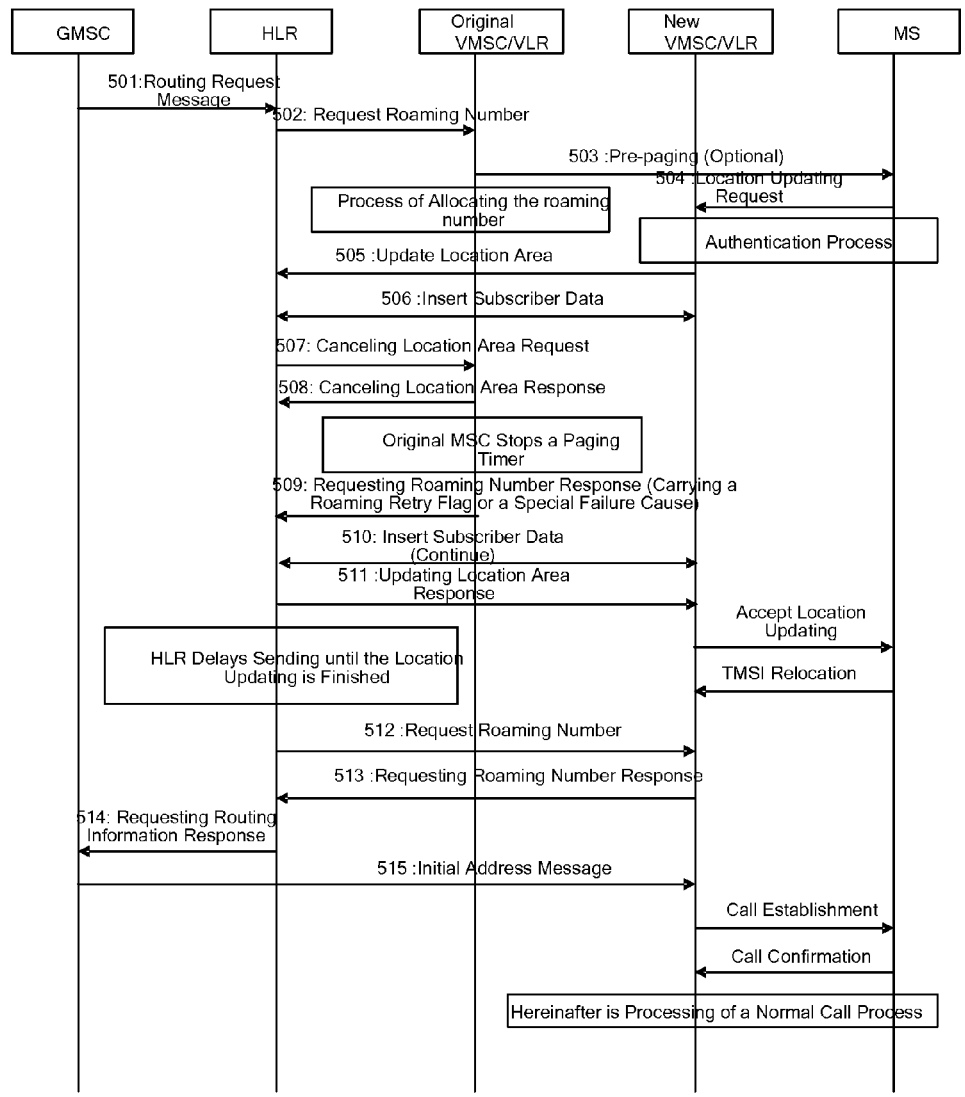
FIG. 5 is a schematic diagram of signaling interaction of an SRI/PRN roaming retry triggered by an HLR and detected by an original VMSC/VLR according to a preferred embodiment of the present invention.

FIG. 5 is a schematic diagram of signaling interaction flow of an SRI/PRN roaming retry triggered by an HLR and detected by an original VMSC/VLR in a pre-paging situation according to a preferred embodiment of the present invention. As shown in FIG. 5, the signaling interaction flow comprises the following processes (step S501-step S515).

Step S501: a GMSC sends a routing request message (SRI).

Herein, the SRI message may carry or not carry a pre-paging supported indication.

Step S502: an HLR sends to the original VMSC/VLR a request message for providing a roaming number (PRN).

Herein, the PRN message may carry or not carry a pre-paging supported indication.

Herein, VMSC/VLR means the VMSC and the VLR are jointly configured, and these two devices are usually configured together and connected via an interface. Generally it is unnecessary to describe messages therebetween.

Step S503: the original VMSC/VLR initiates a pre-paging process or a process of allocating the roaming number.

Herein, a probability of triggering a roaming retry during the pre-paging process is far higher than a probability of triggering a roaming retry during the process of allocating the roaming number as the pre-paging process is much longer than the process of allocating the roaming number.

Preferably, the flow of the HLR triggering the roaming retry may be applied to not only the pre-paging process but also the process of allocating the roaming number.

Optionally, it may be configured whether to allow the pre-paging. If the pre-paging is allowed, whether a final called user can be pre-paged will be first confirmed through the pre-paging process triggered by the PRN message before a call reaches the VMSC where the final called user is located. If the paging is failed, there is no need to establish again a call to the VMSC, and if the paging is successful, the call may be connected to the VMSC. Therefore some operators will establish the pre-paging process as the pre-paging has the above advantages.

Step S504: during the pre-paging period, an MS moves into another new MSC/VLR and initiates a new location updating (Update Location) process.

Step S505: the new MSC/VLR sends a message for updating the location area (Update Location message) to the HLR to initiate a location updating process.

As a matter of fact, as a timer of paging of a core network during the pre-paging process is set quite long, the longest may be 9 seconds during which a user moving at a high speed may move a distance of more than 100 m. While within the distance of more than 100 m, there is absolutely the possibility that a user at an edge of the location area moves from one location area into another location area. Such situation may more likely occur in a city where the base station coverage range is denser and the radio channel situation is complex.

Step S506: the HLR and the new VMSC/VLR are carrying out a process of inserting subscriber data (multiple) therebetween.

In a specific implementing process, step S506 and step S507 are not necessarily in a sequential order, but they may be carried out in parallel.

Step S507: the HLR sends a Cancel Location (canceling location area request) message to the original MSC/VLR to delete the subscriber data of the user in the original MSC/VLR.

Step S508: the original MSC/VLR returns a canceling location area response message to the HLR and completes a process of deleting the subscriber data in the original MSC/VLR.

Step S509: as the original MSC/VLR, during the processing of the request for allocating the roaming number and after receiving the Cancel Location, determines that the user roams, so that it will terminate the PRN process that is being carried out, and trigger the HLR to perform the roaming retry in a PRN ACK via a roaming retry flag or a special failure cause value.

Step S510: the HLR inserts the subscriber data in the new MSC/VLR.

In a specific implementing process, step S510 may include a plurality of steps.

Step S511: after inserting the subscriber data in the new MSC/VLR, the HLR completes a location updating process of the user in the new MSC/VLR, and sends an updating location area response to the new MSC/VLR.

In a specific implementing process, the user performing location updating in the new VMSC/VLR includes encryption and reallocation of temporary mobile subscriber identity ("TMSI" for short).

Step S512: after completing the location updating in the new MSC/VLR, the HLR triggers a roaming retry process, and initiates again to the new MSC/VLR a new process of requesting the roaming number.

In a specific implementing process, the HLR will delay sending the request message for providing the roaming number till the location updating process is finished.

Herein, the process of requesting the roaming number this time will succeed as the user has completed the location updating process in the new MSC/VLR.

It is appointed that the roaming retry is performed twice on the same HLR. Generally, each location area has a large coverage. All message flows herein are progressed very quickly and completed at the level of a second. The user will not move out of the new location area. It is supported to perform the roaming retry once at most, and incessant retry is not allowed.

Step S513: the new VMSC/VLR returns a roaming number to the HLR.

Step S514: the HLR returns the roaming number to the GMSC.

Step S515: the GMSC sends an IAM message to the new VMSC/VLR using the new roaming number, and the subsequent flow will proceed according to a flow of a normal call.

The flow described in FIG. 5 is a processing flow of the roaming retry trigger by the HLR and detected by the original VMSC/VLR. This property can be supported only by upgrading the original VMSC/VLR and the HLR simultaneously, but the flow in FIG. 5 makes minor modification to each network element in the existing system.

It should be noted that the method for triggering the roaming retry process and the home location register are not only adapted to the process of requesting for allocating the roaming number but also applied to the process of sending the routing information (SRI)/providing the subscriber information (PSI) and the process of real-time inquiry request (ATI)/providing the subscriber information (PSI).

During the SRI/PSI process or ATI/PSI process, the HLR also may control to terminate the PSI process in the original VMSC/VLR if the HLR receives the location updating request message initiated by the user in the new VMSC/VLR, and initiate a PSI process to the new VMSC/VLR when the user completing the location updating process in the new VMSC/VLR. The HLR returns an SRI response or an ATI response after the new PSI process performed in the new VMSC/VLR is completed successfully, and returns called location information to the GMSC or SCP. Hereinafter descriptions will be provided in conjunction with examples.

Figure 6:
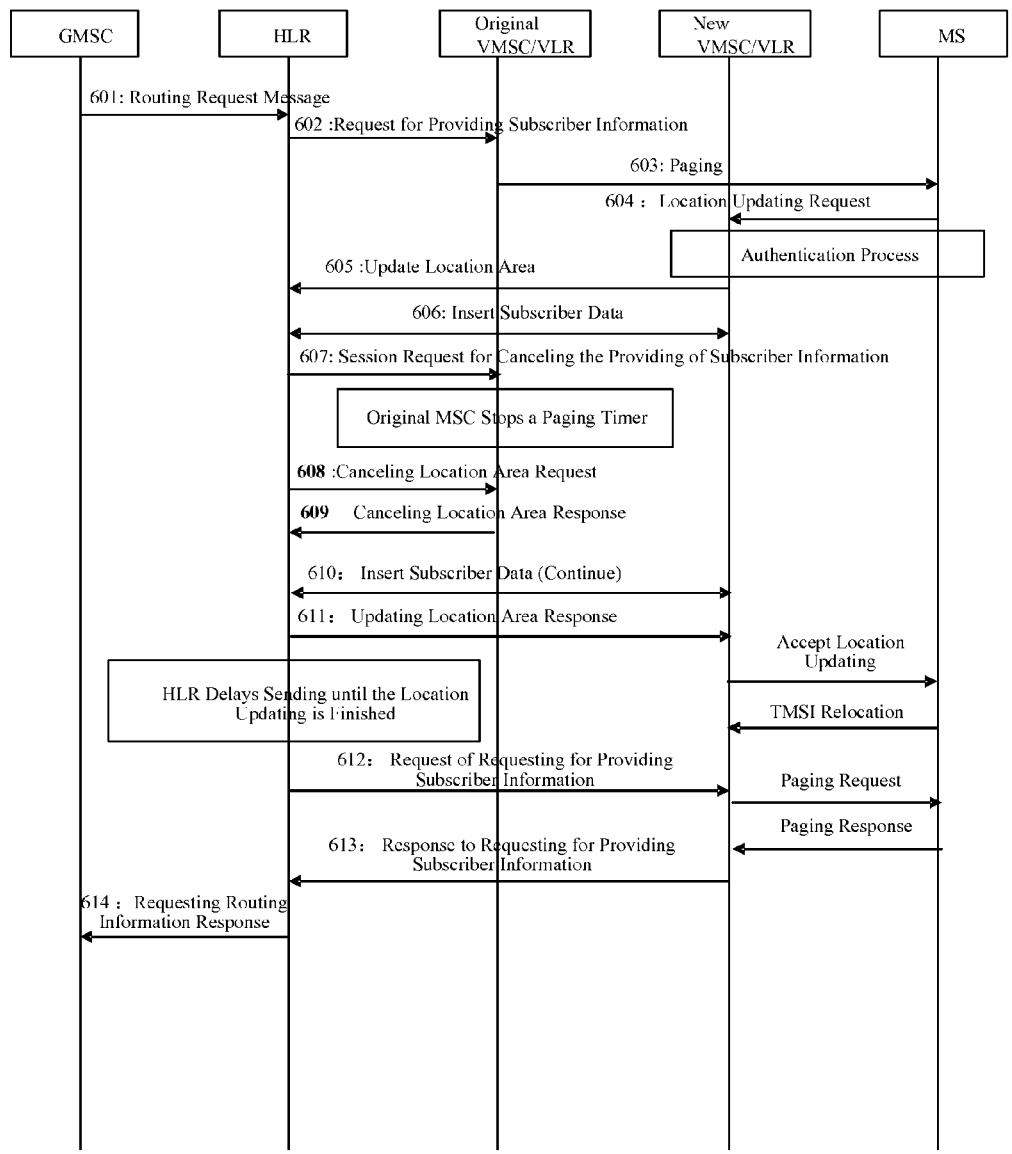
FIG. 6 is a schematic diagram of signaling interaction of an SRI/PSI roaming retry triggered by an HLR and detected by the HLR according to an extended application of an embodiment of the present invention.

FIG. 6 is a schematic diagram of signaling interaction of an SRI/PSI roaming retry triggered by an HLR and detected by the HLR according to an extended application of the present invention. FIG. 6 is an extended application of the present invention in an SRI/PSI flow; and its specific flow is similar to that in FIG. 4. The signaling interaction flow mainly comprises the following processes (step S601-step S614).

Step S601: a GMSC sends a routing request message (SRI).

Herein, the SRI message may carry or not carry a pre-paging supported indication.

Step S602: an HLR sends to an original VMSC/VLR a request message for providing subscriber information (i.e. user address information).

Herein, VMSC/VLR means the VMSC and the VLR are jointly configured, and the two devices are usually configured together and connected via an interface. Generally, it is not necessary to describe messages therebetween.

Step S603: an original VMSC/VLR initiates a paging process.

Step S604: during the paging period, an MS moves into another new MSC/VLR and initiates a new location updating (Update Location) process.

Step S605: the new MSC/VLR sends a message for updating the location area (Update Location message) to the HLR to initiate a location updating process.

Step S606: the HLR and the new VMSC/VLR are carrying out a process of inserting subscriber data (multiple) therebetween.

Step S607: the HLR sends to the original VMSC/VLR a session request for canceling the providing of subscriber information.

Step S608: HLR sends a Cancel Location (canceling location area request) message to the original MSC/VLR to delete the subscriber data of the user in the original MSC/VLR.

Step S609: the original MSC/VLR returns a canceling location area response message to the HLR and completes a process of deleting the subscriber data in the original MSC/VLR.

Step S610: the HLR continues to insert the subscriber data in the new MSC/VLR.

In a specific implementing process, step S610 may include a plurality of steps.

Step S611: after inserting the subscriber data in the new MSC/VLR, the HLR completes a location updating process of the user in the new MSC/VLR, and sends an updating location area response to the new MSC/VLR.

Step S612: after completing the location updating in the new MSC/VLR, the HLR triggers a roaming retry process, and initiates again to the new MSC/VLR a new process of requesting the subscriber information.

In a specific implementing process, the HLR will delay sending the request message for providing the roaming number till the location updating process is finished.

Herein, the process of requesting the roaming number this time will succeed as the user has completed the location updating process in the new MSC/VLR.

It is appointed that the roaming retry is performed twice on the same HLR. Generally, each location area has a large coverage. All message flows herein are progressed very quickly and completed at the level of a second. The user will not move out of the new location area. It is supported to perform the roaming retry once at most, and incessant retry is not allowed.

Step S613: the new VMSC/VLR returns to the HLR a response message about providing the subscriber information.

Step S614: the HLR returns to the GMSC a response message about requesting the routing information.

Figure 7:
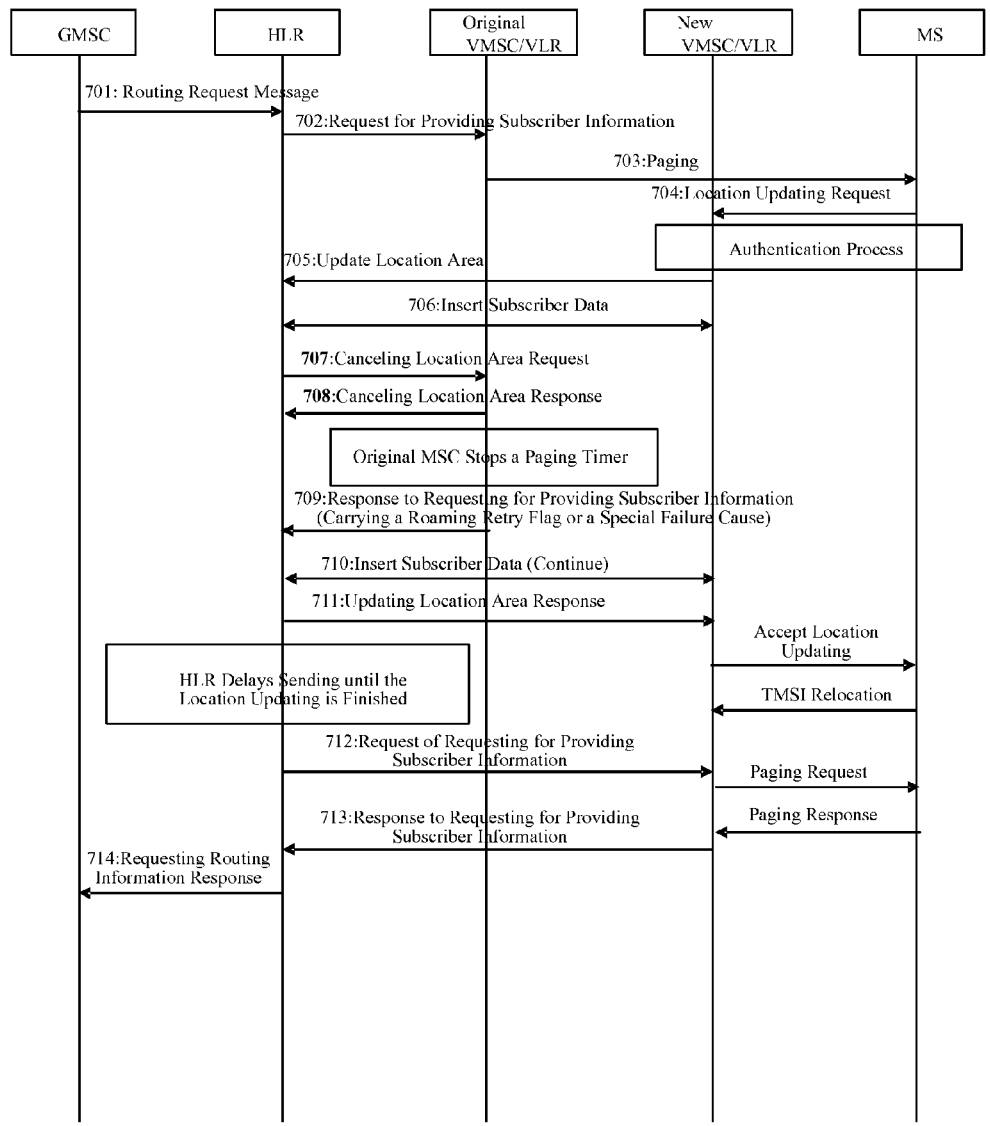
FIG. 7 is a schematic diagram of signaling interaction of an SRI/PSI roaming retry triggered by an HLR and detected by an original VMSC/VLR according to an extended application of an embodiment of the present invention.

FIG. 7 is a schematic diagram of signaling interaction of an SRI/PSI roaming retry triggered by an HLR and detected by an original VMSC/VLR according to an extended application of the present invention. FIG. 7 is an extended application of the present invention in an SRI/PSI flow, and the specific flow is similar to that in FIG. 5. The signaling interaction flow mainly comprises the following processes (step S701-step S714).

Step S701: a GMSC sends a routing request message (SRI).

Step S702: an HLR sends to the original VMSC/VLR a request message for providing subscriber information.

Herein, VMSC/VLR means the VMSC and the VLR are jointly configured, and the two devices are usually configured together and connected via an interface. Generally it is not necessary to describe messages therebetween.

Step S703: the original VMSC/VLR initiates a paging process.

Step S704: during a pre-paging period, an MS moves into another new MSC/VLR and initiates a new location updating (Update Location) process.

Step S705: the new MSC/VLR sends to the HLR a message for updating the location area (Update Location message), to initiate a location updating process.

Step S706: the HLR and the new VMSC/VLR are carrying out a process of inserting subscriber data (multiple) therebetween.

Step S707: the HLR sends a Cancel Location (canceling location area request) message to the original MSC/VLR to delete the subscriber data of the user in the original MSC/VLR.

Step S708: the original MSC/VLR returns a canceling location area response message to the HLR and completes a process of deleting the subscriber data in the original MSC/VLR.

Step S709: as the original MSC/VLR, during the processing of the request for the subscriber information and after receiving the Cancel Location, determines that the user roams, it will terminate the paging process that is being carried out, and trigger the HLR to perform the roaming retry via a roaming retry flag or a special failure cause value in a response message about providing the subscriber information.

Step S710: the HLR continues to insert the subscriber data in the new MSC/VLR.

In a specific implementing process, step S710 may include a plurality of steps.

Step S711: after inserting the subscriber data in the new MSC/VLR, the HLR completes a location updating process of the user in the new MSC/VLR, and sends an updating location area response to the new MSC/VLR.

In a specific implementing process, the user performing location updating in the new VMSC/VLR includes encryption and reallocation of temporary mobile subscriber identity ("TMSI" for short).

Step S712: after completing the location updating in the new MSC/VLR, the HLR triggers a roaming retry process, and initiates again to the new MSC/VLR a new process of requesting the subscriber information.

In a specific implementing process, the HLR will delay sending the request message for providing the subscriber information till the location updating process is finished.

Herein, the process of requesting the roaming number this time will succeed as the user has completed the location updating process in the new MSC/VLR.

Step S713: the new VMSC/VLR returns to the HLR a response message about providing the subscriber information.

Step S714: the HLR returns to the GMSC a response message about requesting the routing information.

Figure 8:
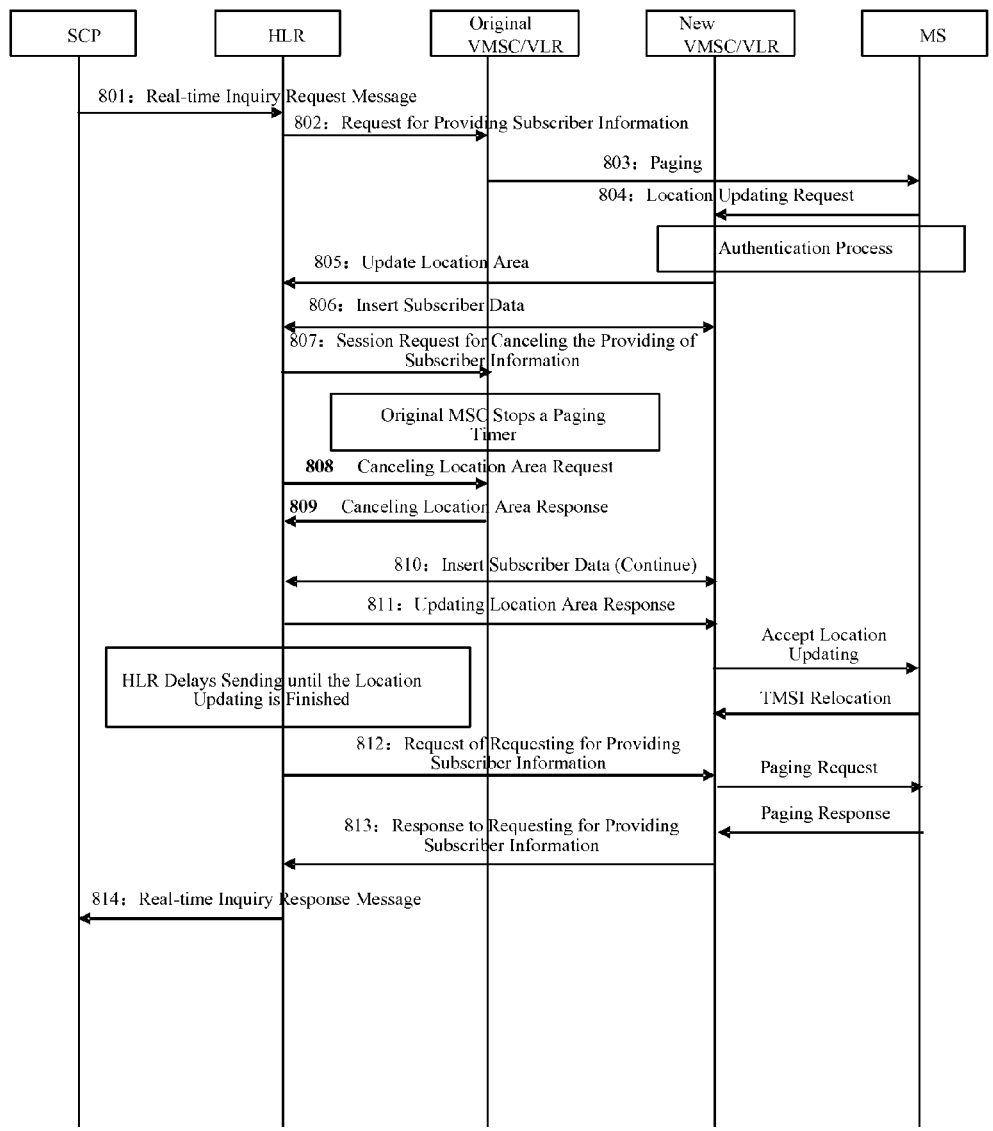
FIG. 8 is a schematic diagram of signaling interaction of an ATI/PSI roaming retry triggered by an HLR and detected by the HLR according to an extended application of an embodiment of the present invention.

FIG. 8 is a schematic diagram of signaling interaction of an ATI/PSI roaming retry triggered by an HLR and detected by the HLR according to an extended application of the present invention. FIG. 8 is an extended application of the present invention in an ATI/PSI flow; and the specific flow is similar to that in FIG. 4. The signaling interaction flow mainly comprises the following processes (step S801-step S814).

Step S801: a SCP sends a real-time inquiry request message to the HLR.

Step S802: the HLR sends to an original VMSC/VLR a request message for providing subscriber information (i.e. user address information).

Specifically, VMSC/VLR means the VMSC and the VLR are jointly configured, and the two devices are usually configured together and connected via an interface. Generally it is unnecessary to describe messages therebetween.

Step S803: an original VMSC/VLR initiates a paging process.

Step S804: during the paging period, an MS moves into another new MSC/VLR and initiates a new location updating (Update Location) process.

Step S805: the new MSC/VLR sends to the HLR a message for updating a location area message (Update Location message) to initiate a location updating process.

Step S806: the HLR and the new VMSC/VLR are carrying out a process of inserting Subscriber Data (multiple) therebetween.

Step S807: the HLR sends to the original VMSC/VLR a session request for canceling the providing of subscriber information.

Step S808: the HLR sends a Cancel Location (canceling location area request) message to the original MSC/VLR to delete the subscriber data of the user in the original MSC/VLR.

Step S809: the original MSC/VLR returns a canceling location area response message to the HLR and completes a process of deleting the subscriber data in the original MSC/VLR.

Step S810: the HLR continues to insert the subscriber data in the new MSC/VLR.

In a specific implementing process, step S810 may include a plurality of steps.

Step S811: after inserting the subscriber data in the new MSC/VLR, the HLR completes a location updating process of the user in the new MSC/VLR, and sends an updating location area response to the new MSC/VLR.

Step S812: after completing the location updating in the new MSC/VLR, the HLR triggers a roaming retry process, and initiates again to the new MSC/VLR a new process of requesting the subscriber information.

In a specific implementing process, the HLR will delay sending the request message for providing the roaming number till the location updating process is finished.

Herein, the process of requesting the roaming number this time will succeed as the user has completed the location updating process in the new MSC/VLR.

It is appointed that the roaming retry is performed twice on the same HLR. Generally, each location area has a large coverage. All message flows herein are progress very quickly and completed at the level of a second. The user will not move out of the new location area. It is supported to perform the roaming retry once at most, and incessant retry is not allowed.

Step S813: the new VMSC/VLR returns to the HLR a response message about providing the subscriber information.

Step S814: the HLR returns to the SCP a response message about requesting a real-time inquiry.

Figure 9:
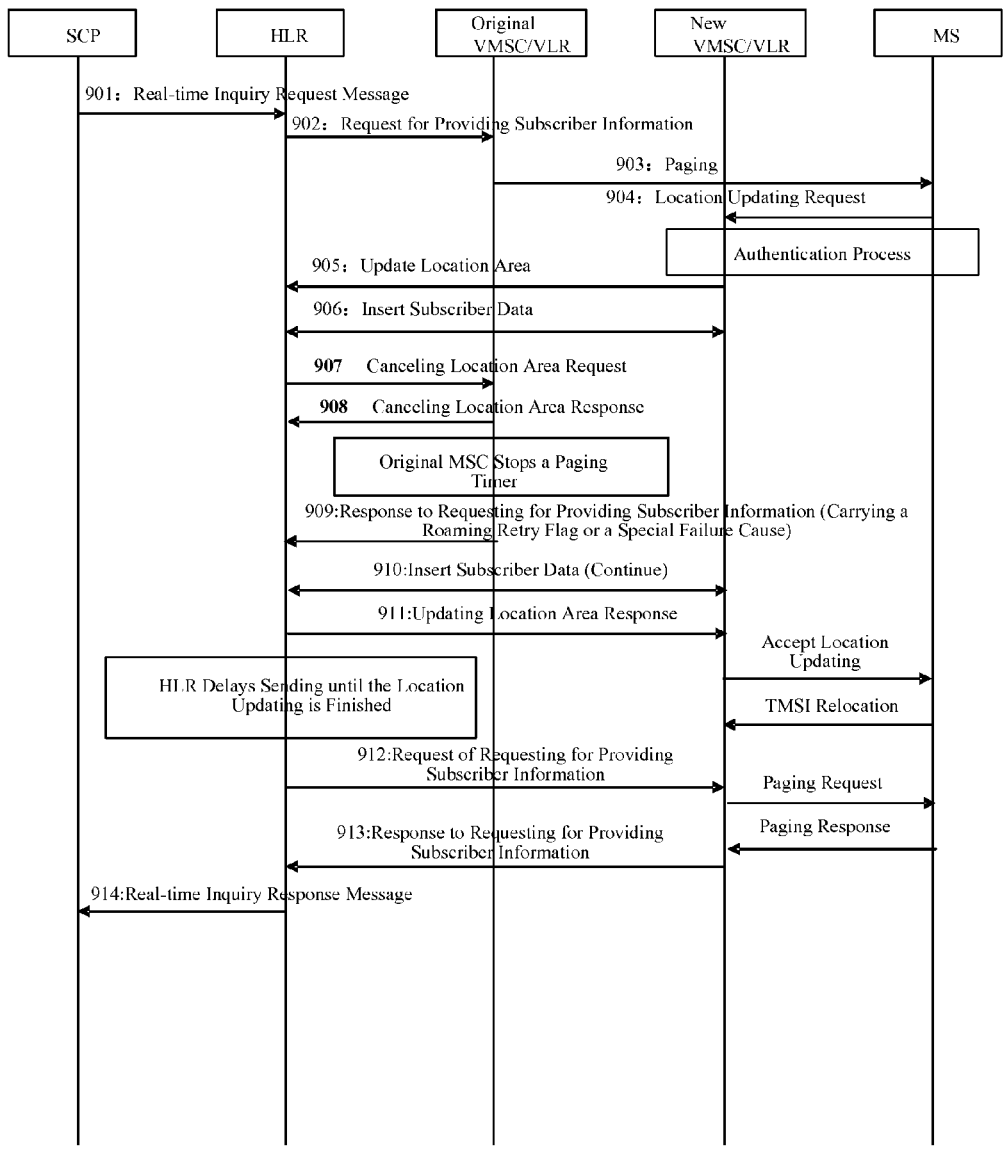
FIG. 9 is a schematic diagram of signaling interaction of an ATI/PSI roaming retry triggered by an HLR and detected by an original VMSC/VLR according to an extended application of an embodiment of the present invention.

FIG. 9 is a schematic diagram of signaling interaction of an ATI/PSI roaming retry triggered by an HLR and detected by the an original VMSC/VLR according to an extended application of the present invention.

FIG. 9 is an extended application of the present invention in an ATI/PSI flow; and the specific flow is similar to that in FIG. 5. The signaling interaction flow mainly comprises the following processes (step S901-step S914).

Step S901: a SCP sends a real-time inquiry request message.

Step S902: the HLR sends to the original VMSC/VLR a request message for providing subscriber information.

Herein, VMSC/VLR means the VMSC and the VLR are jointly configured, and the two devices are usually configured together and connected via an interface. Generally it is unnecessary to describe messages therebetween.

Step S903: the original VMSC/VLR initiates a paging process.

Step S904: during a pre-paging period, an MS moves into another new MSC/VLR and initiates a new location updating (Update Location) process.

Step S905: the new MSC/VLR sends a message for updating the location area (Update Location message) to the HLR to initiate a location updating process.

Step S906: the HLR and the new VMSC/VLR are carrying out a process of inserting subscriber data (multiple) therebetween.

Step S907: the HLR sends a Cancel Location (canceling location area request) message to the original MSC/VLR to delete the subscriber data of the user in the original MSC/VLR.

Step S908: the original MSC/VLR returns a canceling location area response message to the HLR and completes a process of deleting the subscriber data in the original MSC/VLR.

Step S909: as the original MSC/VLR, during the processing of the request for the subscriber information and after receiving the Cancel Location, determines that the user roams, it will terminate the paging process that is being carried out, and trigger the HLR to perform the roaming retry via a roaming retry flag or a special failure cause value in a response message about providing the subscriber information.

Step S910: the HLR continues to insert the subscriber data in the new MSC/VLR.

In a specific implementing process, step S910 may include a plurality of steps.

Step S911: after inserting the subscriber data in the new MSC/VLR, the HLR completes a location updating process of the user in the new MSC/VLR, and sends an updating location area response to the new MSC/VLR.

In a specific implementing process, the user performing location updating in the new VMSC/VLR includes encryption and reallocation of temporary mobile subscriber identity ("TMSI" for short).

Step S912: after completing the location updating in the new MSC/VLR, the HLR triggers a roaming retry process, and initiates again to the new MSC/VLR a new process of requesting the subscriber information.

In a specific implementing process, the HLR will delay sending the request message for providing the subscriber information until the location updating process is finished.

Herein, the process of requesting the roaming number this time will succeed as the user has completed the location updating process in the new MSC/VLR.

Step S913: the new VMSC/VLR returns to the HLR a response message about providing the subscriber information.

Step S914: the HLR returns to the SCP a response message about requesting a real-time inquiry.

Apparatus Embodiments

A home location register is further provided according to an embodiment of the present invention and is applied to a situation that a mobile station moves from an original visitor mobile switching center (VMSC)/visitor location register (VLR) to an area covered by a new VMSC/VLR.

Figure 10:
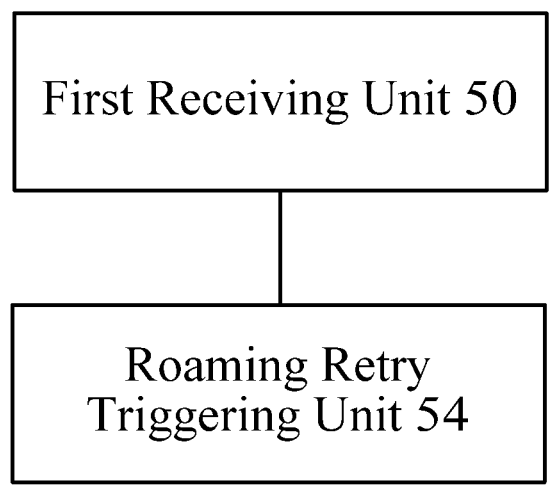
FIG. 10 is a structure block diagram of a home location register according to an embodiment of the present invention.
Figure 11:
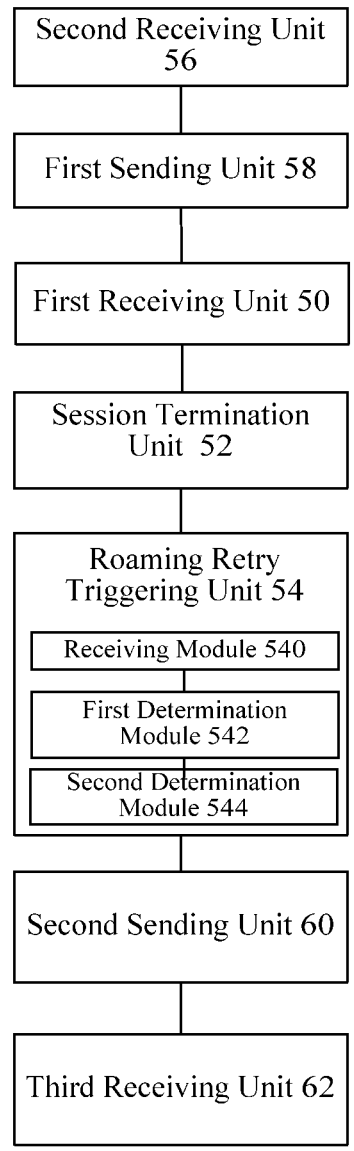
FIG. 11 is a structure diagram of a home location register according to a preferred embodiment of the present invention.

FIG. 10 is a structure block diagram of a home location register according to an embodiment of the present invention. FIG. 11 is a structure diagram of a home location register according to a preferred embodiment of the present invention. As shown in FIG. 10, the home location register according to the embodiment of the present invention comprises a first receiving unit 50 and a roaming retry triggering unit 54 which will be described below in conjunction with FIG. 11.

The first receiving unit 50 is configured to receive a location updating request message from a mobile station through a new VMSC/VLR when requesting for allocating a roaming number or providing subscriber information.

The roaming retry triggering unit 54 is configured to trigger a roaming retry process when the mobile station completes location updating in an area covered by the new VMSC/VLR.

Preferably as shown in FIG. 11, the roaming retry triggering unit 54 may further comprise: a receiving module 540 configured to receive a response message which respond to providing the roaming number or providing the subscriber information and comes from an original VMSC/VLR, wherein the response message carries information of a roaming retry flag and/or a failure cause value; and a first determination module 542 is configured to determine whether to trigger the roaming retry process according to the roaming retry flag and/or the failure cause value.

Preferably as shown in FIG. 11, the roaming retry triggering unit 54 may also comprise a second determination module 544 configured to determine whether to trigger directly the roaming retry process.

Preferably as shown in FIG. 11, the home location register may also comprise a second receiving unit 56 and a first sending unit 58, wherein the second receiving unit 56 is configured to receive a routing request message from a gateway mobile switching center (GMSC) or a real-time inquiry request message from a service control point; and the first sending unit 58 is connected between the second receiving unit 56 and the first receiving unit 50 and configured to send to the original VMSC/VLR a request message for providing the roaming number or providing the subscriber information.

Preferably as shown in FIG. 11, the home location register may also comprise a session termination unit 52 configured to terminate a session with the original VMSC/VLR.

Preferably, the session termination unit 52 is configured to send to the original VMSC/VLR a canceling request about providing the roaming number or providing the subscriber information, to terminate a process that is currently carried out for providing the roaming number or providing the subscriber information.

Preferably, the session termination unit 52 is also configured to send a canceling location area request message to the original VMSC/VLR to terminate a process that is being carried out for requesting for allocating the roaming number or providing the subscriber information.

Preferably as shown in FIG. 11, the home location register may also comprise a second sending unit 60 configured to send to the new VMSC/VLR a request message for providing the roaming number or the subscriber information; and a third receiving unit 62 configured to receive a mobile station Roaming Number or the subscriber information from the new VMSC/VLR and return a routing request response message.

Reference may be made to descriptions to FIG. 2-FIG. 9 for a working flow of combining the units and modules of the home location register with each other, and it will not be repeated herein.

A home location register is provided through the above embodiments. As this Register detects that the user's location is updated into other MSC/VLR during the process of the user requesting the roaming number or subscriber information, and the HLR controls to initiate a roaming retry process to a new MSC/VLR. The problem of pre-paging failure caused when the called user simultaneously moves out of the local location area during the pre-paging is solved. With the present method, the roaming retry process may be triggered in the situation that the user is failed in pre-paging, without additional messages such as RCH message or additional fields added to the messages. The present method is advantageous in reducing the number of message flow interactions and may effectively avoid a problem of controlling a time sequence of SRI ACK and RCH at a GMSC side brought by use of RCH.

To sum up, through the above embodiments in the present invention, the HLR detects that the location is updated into other MSC/VLR during the process of the user requesting the roaming number, and the HLR controls to initiate a roaming retry process to a new MSC/VLR. The problem of pre-paging failure caused when the called user simultaneously moves out of the local location area during the pre-paging is solved. With the present solution, the roaming retry process can be triggered in the situation that the user is failed in pre-paging, without additional messages such as RCH message or additional fields added to the messages, which is advantageous in reducing the number of message flow interactions and can effectively avoid a problem of controlling a time sequence of SRI ACK and RCH at a GMSC side brought by use of RCH.

In addition, the present solution makes up the shortcomings of CP-070328 of standard 3GPP, solves the problem of roaming retry in pre-paging that is not solved by CP-070328 of 3GPP, perfects a call flow of a user having a strong mobility, and improves the probability of successful call of the user having a strong mobility at the edge of the location area.

Apparently, those skilled in the art should know that each step or each module in the present invention can be realized by the general calculating apparatus; and they can be collected in a single calculating apparatus or distributed on the network formed by a plurality of calculating apparatus. Optionally, they can be realized by the program codes executable by the calculating apparatus. Therefore, they can be stored in the storing apparatus to be executed by the calculating apparatus, or they can be fabricated into integrated circuit modules respectively, or the steps therein are fabricated into individual integrated circuit module for implementation. Thus, the present invention is not limited to the combination of any particular hardware and software.

The above mentioned is only the preferred embodiments of the present invention but not to limit the present invention. Various alterations and changes to the present invention are apparent to those skilled in the art. Any modifications, equivalent substitutions, improvements etc. within the spirit and principle of the present invention should be included in the protection scope of the present invention.

What is claimed is:

1. A method for triggering a roaming retry process, applied to a situation that a mobile station moves from an original visitor mobile switching center (VMSC)/visitor location register (VLR) to an area covered by a new VMSC/VLR, wherein the method comprises:
    a home location register (HLR) receiving a location updating request message from the mobile station through the new VMSC/VLR when requesting for allocating a roaming number or providing subscriber information; and
    the HLR triggering the roaming retry process when the mobile station completes location updating in the area covered by the new VMSC/VLR.

2. The method according to claim 1, wherein when requesting for allocating the roaming number or providing the subscriber information, the method further comprises:
    the HLR receiving a routing request message from a gateway mobile switching center (GMSC) or a real-time inquiry request message from a service control point (SCP);
    the HLR sending to the original VMSC/VLR a request message for providing the roaming number or a request message for providing the subscriber information; and
    the original VMSC/VLR allocating the roaming number or returning the subscriber information.

3. The method according to claim 2, wherein after the HLR receives the location updating request message from the mobile station through the new VMSC/VLR, the method further comprises:
    the HLR terminating a session with the original VMSC/VLR.

4. The method according to claim 3, wherein the HLR terminating the session with the original VMSC/VLR comprises:
    the HLR sending to the original VMSC/VLR a canceling request about providing the roaming number or providing the subscriber information; and the original VMSC/VLR terminating a process that is currently carried out for providing the roaming number or providing the subscriber information;
    or,
    the HLR sending a canceling location area request message to the original VMSC/VLR; and
    the original VMSC/VLR terminating a process that is being carried out for requesting for allocating the roaming number or providing the subscriber information, and returning a roaming retry flag or a special failure cause value in a response message about requesting for allocating the roaming number or providing the subscriber information.

5. The method according to claim 4, wherein when the original VMSC/VLR terminates the process that is currently carried out for providing the roaming number, the method further comprises:
    the original VMSC/VLR interrupting a current pre-paging process.

6. The method according to claim 5, wherein the original VMSC/VLR interrupting the current pre-paging process comprises:
    the original VLR sending a message for interrupting pre-paging to the original VMSC via an interface between the original VMSC and the original VLR; and
    the original VMSC interrupting the current pre-paging process.

7. The method according to claim 1, wherein after the HLR receives the location updating request message from the mobile station through the new VMSC/VLR, the method further comprises:
    the HLR terminating a session with the original VMSC/VLR.

8. The method according to claim 7, wherein the HLR terminating the session with the original VMSC/VLR comprises:
    the HLR sending to the original VMSC/VLR a canceling request about providing the roaming number or providing the subscriber information; and the original VMSC/VLR terminating a process that is currently carried out for providing the roaming number or providing the subscriber information;
    or,
    the HLR sending a canceling location area request message to the original VMSC/VLR; and the original VMSC/VLR terminating a process that is being carried out for requesting for allocating the roaming number or providing the subscriber information, and returning a roaming retry flag or a special failure cause value in a response message about requesting for allocating the roaming number or providing the subscriber information.

9. The method according to claim 8, wherein when the original VMSC/VLR terminates the process that is currently carried out for providing the roaming number, the method further comprises:
the original VMSC/VLR interrupting a current pre-paging process.

10. The method according to claim 9, wherein the original VMSC/VLR interrupting the current pre-paging process comprises:
the original VLR sending a message for interrupting pre-paging to the original VMSC via an interface between the original VMSC and the original VLR; and
the original VMSC interrupting the current pre-paging process.

11. The method according to claim 1, wherein the HLR triggering the roaming retry process comprises:
the HLR receiving from the original VMSC/VLR a response message about providing the roaming number or providing subscriber information, wherein the response message carries information of a roaming retry flag and/or a failure cause value; and the HLR determining a triggering according to the roaming retry flag and/or the failure cause value;
or,
the HLR directly triggering the roaming retry process.

12. The method according to claim 11, wherein the roaming retry process comprises:
the HLR sending to the new VMSC/VLR a request message for providing the roaming number or requesting the subscriber information; and
the HLR receiving a mobile station roaming number or the subscriber information from the new VMSC/VLR, and returning a routing request response message.

13. The method according to claim 1, wherein the roaming retry process comprises:
the HLR sending to the new VMSC/VLR a request message for providing the roaming number or requesting the subscriber information; and
the HLR receiving a mobile station roaming number or the subscriber information from the new VMSC/VLR, and returning a routing request response message.

14. A home location register, applied to a situation that a mobile station moves from an original visitor mobile switching center (VMSC)/visitor location register (VLR) to an area covered by a new VMSC/VLR, wherein the home location register comprises:
a first receiving unit, configured to receive a location updating request message from the mobile station through the new VMSC/VLR when requesting for allocating a roaming number or user location information; and
a roaming retry triggering unit, configured to trigger a roaming retry process when the mobile station completes location updating in the area covered by the new VMSC/VLR.

15. The home location register according to claim 14, wherein the home location register further comprises:

a second receiving unit, configured to receive a routing request message from a gateway mobile switching center (GMSC) or a real-time inquiry request message from a service control point (SCP); and
a first sending unit, configured to send to the original VMSC/VLR a request message for providing the roaming number or providing subscriber information.

16. The home location register according to claim 14, wherein the home location register further comprises:
a session termination unit, configured to terminate a session with the original VMSC/VLR.

17. The home location register according to claim 16, wherein
the session termination unit is further configured to send to the original VMSC/VLR a canceling request about providing the roaming number or providing the subscriber information, to terminate a process that is currently carried out for providing the roaming number or providing the subscriber information;
or,
the session termination unit is further configured to send a canceling location area request message to the original VMSC/VLR to terminate a process that is being carried out for requesting for allocating the roaming number or providing the subscriber information.

18. The home location register according to claim 14, wherein the roaming retry triggering unit comprises:
a receiving module, configured to receive from the original VMSC/VLR a response message about providing the roaming number or providing subscriber information, wherein the response message carries information of a roaming retry flag and/or a failure cause value; and a first determination module, configured to determine whether to trigger the roaming retry process according to the roaming retry flag and/or the failure cause value;
or,
a second determination module, configured to determine whether to directly trigger the roaming retry process.

19. The home location register according to claim 18, wherein the home location register further comprises:
a second sending unit, configured to send to the new VMSC/VLR a request message for providing the roaming number or subscriber information; and
a third receiving unit, configured to receive a mobile station roaming number or the subscriber information from the new VMSC/VLR and return a routing request response message.

20. The home location register according to claim 14, wherein the home location register further comprises:
a second sending unit, configured to send to the new VMSC/VLR a request message for providing the roaming number or subscriber information; and
a third receiving unit, configured to receive a mobile station roaming number or the subscriber information from the new VMSC/VLR and return a routing request response message.

* * * * *